(12) United States Patent
Nishida

(10) Patent No.: US 7,292,375 B2
(45) Date of Patent: Nov. 6, 2007

(54) METHOD AND APPARATUS FOR COLOR IMAGE PROCESSING, AND A COMPUTER PRODUCT

(75) Inventor: Hirobumi Nishida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 780 days.

(21) Appl. No.: 09/734,591

(22) Filed: Dec. 13, 2000

(65) Prior Publication Data

US 2002/0071131 A1    Jun. 13, 2002

(30) Foreign Application Priority Data

Dec. 14, 1999   (JP)   ................ 11-354412

(51) Int. Cl.
- G06K 15/00   (2006.01)
- G06T 5/00    (2006.01)
- H04N 1/407   (2006.01)
- H04N 1/409   (2006.01)
- H04N 1/38    (2006.01)

(52) U.S. Cl. .................... 358/3.26; 358/464
(58) Field of Classification Search ................ 358/1.9, 358/3.26, 3.27, 448, 462–464; 382/275, 382/112, 176
See application file for complete search history.

(56) References Cited

U.S. PATENT DOCUMENTS

| | | | | |
|---|---|---|---|---|
| 5,271,064 A | * | 12/1993 | Dhawan et al. | ............ 382/266 |
| 5,280,367 A | * | 1/1994 | Zuniga | ........................ 358/462 |
| 5,646,744 A | | 7/1997 | Knox | ......................... 358/401 |
| 5,742,704 A | * | 4/1998 | Suzuki et al. | ............... 382/176 |
| 5,767,945 A | * | 6/1998 | Fields et al. | .................. 355/39 |
| 5,778,092 A | * | 7/1998 | MacLeod et al. | ........... 382/176 |
| 5,832,137 A | * | 11/1998 | Knox | .......................... 382/275 |
| 5,880,858 A | * | 3/1999 | Jin | .............................. 358/487 |
| 5,932,137 A | | 8/1999 | Baba et al. | ............ 252/299.66 |

(Continued)

FOREIGN PATENT DOCUMENTS

JP        7-087295        3/1995

(Continued)

OTHER PUBLICATIONS

Jaakko Sauvola, et al., "Adaptive Document Binarization," Proc. 4th Int. Conf. Document Analysis and Recognition (Ulm, Germany), IEEE, Aug. 18-20, 1997.

Primary Examiner—David Moore
Assistant Examiner—James A. Thompson
(74) Attorney, Agent, or Firm—Oblon, Spivak, McClelland, Maier & Neustadt, P.C.

(57) ABSTRACT

A show-through is removed as follows. Resolution of the color image is reduced and the color coordinate system is transferred to a one having a high independence. Then, edge intensity is calculated, edge-detection is performed. Then, color threshold processing is performed on a region except the edge to estimate a background color image, and the show-through removed image is synthesized. Edge difference image is calculated from respective edge intensity of the original image and the show-through removed image, any portion where the image is degraded due to inadequate processing is detected, a scale for processing (the size of a window) around such portion is reduced and the same processing is performed again. A show-through portion is then identified by calculating a difference between the show-through removed image and the reduced original image, the show-through portion is removed, and the image is printed.

34 Claims, 12 Drawing Sheets

U.S. PATENT DOCUMENTS

| | | | |
|---|---|---|---|
| 5,966,455 A * | 10/1999 | Saito | 382/112 |
| 5,973,792 A | 10/1999 | Matsuda | 358/448 |
| 6,014,462 A * | 1/2000 | Yamakawa | 382/200 |
| 6,044,172 A * | 3/2000 | Allen | 382/166 |
| 6,101,283 A * | 8/2000 | Knox | 382/254 |
| 6,285,470 B1 * | 9/2001 | Matsuda et al. | 358/474 |

FOREIGN PATENT DOCUMENTS

| | | |
|---|---|---|
| JP | 8-265563 | 10/1996 |
| JP | 9-205544 | 8/1997 |
| JP | 9-233319 | 9/1997 |
| JP | 10-271336 | 10/1998 |
| JP | 11-041466 | 2/1999 |
| JP | 11-55524 | 2/1999 |
| JP | 11-187266 | 7/1999 |
| JP | 11-284846 | 10/1999 |

* cited by examiner

ON PIXEL

ON PIXEL

METHOD AND APPARATUS FOR COLOR IMAGE PROCESSING, AND A COMPUTER PRODUCT

FIELD OF THE INVENTION

The present invention relates in general to a technology for color image processing. More particularly, this invention relates to the color image processing method for enabling removal of show-through when matter is printed on both the sides of a paper. Here, "show-through" means a phenomenon that the matter printed on one side of the paper is seen from the other side of the paper.

BACKGROUND OF THE INVENTION

FIG. 4 explains the phenomenon of show-through, and it is assumed that the objects shown are colored ones. In accordance with wide spread availability of equipment that can capture or print color images, the use of color images in magazines, catalogues, advertisement, or newspapers has become common. Examples of equipment that can capture color images are color scanners, digital cameras, and digital color copiers. In almost all the cases an image or matter is printed on both sides of the paper. However, sometimes the image on one side of the paper can be seen even from the other side. This fact is shown in FIG. 4. The image 4C is printed on the back side of the paper and the other images are printed on the front side of the paper. However, the image 4C printed on the back side of the paper is seen from the front side. Further, in many cases, a color document has a different background color, or has image patterns, other patterns, and photographs together with one another. Therefore, the problem of removing "show-through" from the input image by performing digital image processing has been regarded as being difficult to handle although it is important for improvement in image quality.

Methods for removing show-through on special equipment, such as a book scanner or a double-side scanner, are known. Such methods have been disclosed, for example, in Japanese Patent Nos. HEI 07-8795A, HEI 08-265563A, HEI 09-205544A, HEI 09-233319A, or U.S. Pat. Nos. 5,973,792 and 5,932,137.

U.S. Pat. No. 5,932,137 discloses a method and apparatus for mitigating the effects of show-through by scanning both sides of the paper and storing the scanned images. The invention according to this publication is realized by scanning a duplexed document with show-through derived from the second side at least on the first side, storing a first side image and a second side image, generating a representation (mirror-image conversion, registration of images) corresponding to a component attributable to show-through from the second side image to the first side, and correcting (using a show-through coefficient) the image by removing the show-through from the first side as a function of the representation of the second side image. Further, the image processing method for mitigating the effects of show-through is performed by scanning a first side and then a second side of a duplexed document with show-through derived from the second side on the first side, storing the first side image and the second side image, generating a representation (mirror-image conversion, registration of images) corresponding to a component attributable to show-through from the second side image to the first side (and from the first side image to the second side), and correcting (using a show-through coefficient) the image by removing the show-through as a function of the representation of the second side image (first side image) from the first side (second side). Further, in this publication, there has been described a document printing system which mitigates the effects of show-through for printing an image with mitigated effects of show-through. More specifically, this system comprises a scanner that scans a duplexed document with show-through derived from the second side at least on the first side, and stores images on the first side and the second side, an image processing circuit (mirror-image conversion, registration of images) that generates a representation corresponding to a component attributable to show-through from the second side image to the first side, and an image processing unit (using a show-through coefficient) that removes the show-through from the first side as a function of the representation of the second side image, and corrects the image.

In the above-mentioned methods, at first, the input images on both sides of the paper are accurately aligned in their position, and the images on both sides are compared to each other to estimate a transmission coefficient of paper. By subtracting a component attributable to show-through from the front side image using the transmission coefficient, the show-through is removed. However, there is a problem in these methods such that the methods can not be applied to any other equipment except specific input equipment that can input and store images on both sides and accurately register the images or such environments.

Other methods for removing the show-through have been proposed based on analysis or binarization of image density using only information for a single-side image. For example, the methods have been proposed in Japanese Patent Nos. HEI 11-187266A, HEI 11-41466A, [J. Sauvola, T. Seppanen, S. Haapakoski, and M. Pietikainen, "Adaptive document binarization," Proc. 4th Int. Conf. Document Analysis and Recognition (Ulm, Germany) Aug. 18-20, 1997, pp. 142-146.], U.S. Pat. Nos. 5,646,744 and 5,832,137. However, when the image is complicated, it is difficult to discriminate between a front side image and show-through using density or color distribution. Using such analyses, a risk arises such that a character having low contrast to a background in particular, for example, a character in yellow on a white backgrounds, may be processed as a show-through image.

Thus, the method of scanning and storing the images has a problem that it can only be utilized on special equipment and cannot be applied to other equipment. Such special equipment can input and store images on both sides of the paper and can accurately align the positions of both the images.

On the other hand, the method of using the image density has a problem that it is difficult to discriminate between a front side image and show-through image using density or color distribution when the image is complicated. With this method, there may be a case that a character having low contrast to a background in particular, for example, a character in yellow on a white background is processed as show-through.

SUMMARY OF THE INVENTION

It is an object of this invention to provide a color image processing method which is applied to general-purpose equipment without depending on a specific input device and which can remove show-through from a color image by using only information for a single-side image when a color document printed on both sides and having show-through derived from the second side on the first side is to be scanned. The object of this invention is also to provide a color image processing apparatus for executing the method, and a computer-readable recording medium where a program for making a computer execute the method and the functions of the apparatus is recoded.

According to one aspect of this invention, a component corresponding to the show-through is removed based on detection of the intensity of an edge and color threshold processing for a digital color image obtained by digitally inputting a document color-printed on both sides of paper.

According to another aspect of this invention, a component corresponding to the show-through is removed based on detection of the intensity of an edge and color threshold processing for a digital color image obtained by digitally inputting a document color-printed on both sides of paper, an image from which the show-through has been removed obtained as a result of the processing is compared with edge distribution of an original image. In the show-through removed image, the color threshold processing is again applied to the periphery of an edge which does not exist in the original image to correct the image.

According to still another aspect of this invention, the color threshold processing is performed by setting a window of a predetermined size in a portion where no edge exists in the edge distribution obtained by binarizing the detected edge intensity, locally classifying pixels within the window into two colors, and replacing the color of the pixels within the window with the color with high brightness (light color).

According to still another aspect of this invention, a component corresponding to the show-through is removed based on detection of edge intensity of a front side image of a document and color threshold processing without having to input the rear side of the document.

According to still another aspect of this invention, in the show-through removed image, the color threshold processing is again applied to the periphery of an edge which does not exist in the original image, and when the image is to be corrected, the size of the window according to the invention is set to a smaller size as compared to that in the previous processing.

According to still another aspect of this invention, in comparison between the show-through removed image and the edge distribution of the original image, at each pixel, the edge intensity calculated in the original image is subtracted from the edge intensity calculated in the show-through removed image. As a result, the value higher than the predetermined threshold is determined as an edge which does not exist in the original image in the show-through removed image.

Other objects and features of this invention will become apparent from the following description with reference to the accompanying drawings.

BRIEF DESCRIPTION OF THE DRAWINGS

FIG. 4 shows an example of a color image with show-through;

DESCRIPTION OF THE PREFERRED EMBODIMENTS

As actual cases of utilizing the processing for show-through may be as follows. That is, embedding of the method to a digital color copier, application software of scanners and digital cameras, or pre-processing in image analysis/recognition system of a color document. In this invention, considering such variations of the situations and environments, the problem to deal with show-through of a color image has been analyzed in following approaches.

1) Using only a Front Side Image Without Having to Use Information for a Rear Side Image:

A method for inputting images on both sides and subtracting the rear side image from the front side image requires high-precision registration technology. In general, non-linear geometrical transformation is in many cases added to an input image due to optical and mechanical factors. Therefore, this method is difficult to be used in any devices except specific input equipment such as a double-side scanner or a book scanner. Accordingly, any method for using only a front side image without having to use information for a rear side image has mainly been sought, and then some points that can not be dealt with by only the information for a single-side image are complemented by information for its rear side image.

2) Method Based on Local Operation:

As a case where the method is installed, it is considered that the method is embedded into software on PC or WS, or a digital color copier. There is a big difference between these two in restriction to their working memories (the number of lines that can temporarily be processed). In the software on the PC or the WS, whole information for an image is allowed to be randomly accessed, while in an embedded device, only local information is generally allowed to be accessed. Therefore, the method based on local operation of an image has mainly been sought.

3) Optimal Setting of Processing Parameters Based on General Operation:

Setting parameters to define operational effects is essential in an image processing algorithm/system. Of these parameters, some requires different setting for each image. When whole information for an image can be accessed, the method for optimally setting parameters based on general image operation can be installed.

Based on such an approach, it is possible to remove show-through from a color image by using only information for a single-side image of paper, which is applied to general-purpose equipment without depending on a specific input device.

Figure 1:
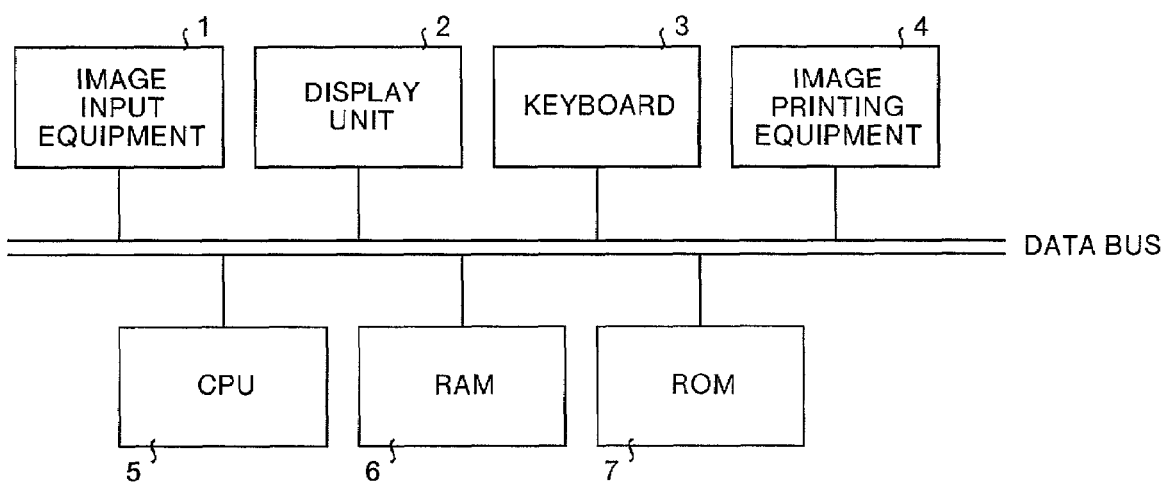
FIG. 1 is a block diagram of modules showing a color image processing apparatus according to an embodiment of this invention.

FIG. 1 is a block diagram of modules showing a color image processing apparatus according to an embodiment of this invention. In this embodiment, a color image input from image input equipment 1, such as a scanner or a digital camera, is stored in the RAM 6. A series of processing explained later is executed by reading the program stored in ROM 7 by CPU 5. A progress report or result on the processing is provided to a user through a display unit 2 such as a CRT. The user inputs and specifies any parameters required for the processing through a keyboard 3 as necessary. Intermediate data (reduced color image, color transformed image, edge intensity image, binary edge image, background color image, binary edge difference image, show-through removed image) produced during performance of the processing explained later is stored in the RAM 6. The data is then read out and corrected or written from and in the RAM 6 by the CPU 5 as necessary. The show-through removed image generated as a result of the series of processing is read out from the RAM 6, and is output to image printing equipment (printer) 4.

Figure 2:
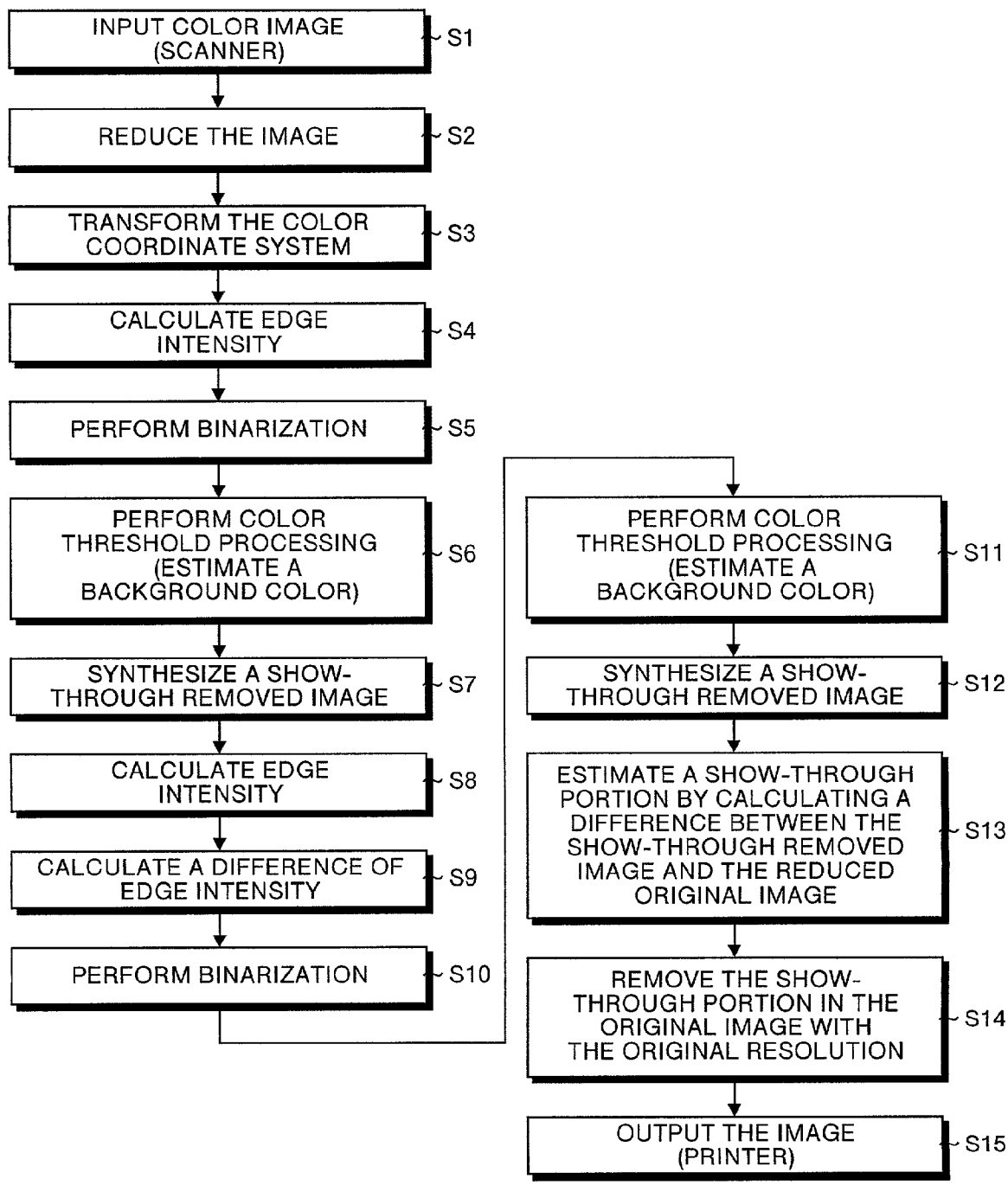
FIG. 2 is a flow chart showing a color image processing method according to an embodiment of this invention.

FIG. 2 is a flow chart showing a color image processing method according to this embodiment. This invention mainly corresponds to an image processing section of a digital color copier. Before the processing in this invention, pre-processing such as A/D conversion and density correction is executed as usual, and gray-scale processing or the like is executed after the processing.

When a color image is input by a scanner 1 (step S1) the image is first reduced (step S2). By processing the image produced by reducing the original image, the processing is speeded up, a used space in working memory is reduced, and installation is simplified. A color coordinate system is then transformed (step S3). In a RGB space, components are not highly independent from one another, accordingly, precision of edge detection and robustness against noise may not be increased. Therefore, the coordinate system is transformed to an appropriate one to improve the precision of edge detection and the robustness against noise.

Subsequently, edge intensity is calculated (step S4). By detecting the edge intensity, a foreground portion of a color document such as a text or a line drawing and a background portion with higher brightness (light color) than the show-through portion can resultantly be retained. An edge is then detected by binarizing the portions (step S5), and color threshold processing is executed on a region except the edge (step S6). The show-through portion can be corrected without entry or storage of the rear side image. The front side and the show-through portion can be discriminated from each other by performing the color threshold processing, and color can specifically be estimated. The size of the show-through portion to be removed can be explicitly specified according to the size of a set window. The processing is performed based on local operation, which leads to economy on a used space in the working memory and simplification of installation. A show-through removed image is synthesized based on the background color image estimated through the color threshold processing (step S7).

The edge intensity of the show-through removed image is then calculated (step S8), and an edge difference image based on the original image and the show-through removed image is generated (step S9). The image produced as a result of the processing is compared to the original image, so that any part where the image is degraded due to inadequate processing can be detected through a simple operation. By executing again the processing around the part, degradation in the image can be prevented, thus improving the result of processing. A difference between the respective edge intensity is binarized (step S10), the processing scale (the size of a window) is reduced, the color threshold processing is performed in the same manner as that in step S6 to estimate a background color image (step S11), and a show-through removed image is synthesized (step S12). Regarding the color threshold processing for correction using a small-sized window, the size of a show-through portion to be removed depends on local characteristics (e.g., complicity) of the front side image, but is determined depending on the size of the window in a complicated portion. By reducing the size of the show-through portion to be removed, degradation in the front side image can be prevented.

Subsequently, a show-through portion is estimated (determined) by calculating a difference between the show-through removed image and the reduced original image (step S13). Lastly, the show-through portion in the original image with original resolution is removed (step S14), and the image is output to the printer (step S15).

The characteristics of the color image processing method according to this invention is explained below.

1) Utilization of Color Edge Intensity

A show-through portion is input after passing through paper, which gives the portion the same effect as a low-pass filter that acts on the portion. The characteristics of this filter depend on physical characteristics of paper, therefore, it is difficult to specify them quantitatively. However, it is natural to assume that the edge intensity of the show-through portion is lower as compared to that of the front side image. In order to calculate edge intensity with high precision, it is desirable to make use of edge detection [A. Cumani, "Edge detection in multispectral images," Graphical Models and Image Processing, vol. 53, no. 1, pp. 40-51, 1991.], [H. -C. Lee and D. R. Cok, "Detecting boundaries in a vector field," IEEE Trans.Signal Processing, vol. 39, no. 5, pp. 1181-1194, 1991.] not based on a method for simply summing edge intensity calculated in each component of RGB, but based on a vector method for transforming the color coordinate system to an adequate one and using three components combined. Further, by performing appropriate threshold processing on the edge intensity, the edge of show-through portion can be removed. At the time of selecting thresholds, the edge intensity distribution is statistically analyzed and values are automatically set, or a plurality of thresholds are previously provided and a user sets values according to a degree of show-through or paper quality.

2) Estimation of a Background Color Based on Region-Selectable and Locally-Executed Color Threshold Processing It should be considered that a high-frequency component, in particular, such as a character or a line of the show-through portion is removed. It is assumed now that a window in which no edge exists is set in an image. The interior of this window can be classified into regions from viewpoints of: (a) whether there is show-through in the interior, (b) whether the interior includes a region where the front side image consists of a single color, (c) whether it includes a region where the front side image has color gradation, and (d) whether it includes a region formed with a plurality of different colors because an important edge of the front side image has been removed by thresholding.

When viewed from a local point, the show-through portion has generally lower brightness as compared to that of the front side image. Therefore, the interior of the window is classified into two colors, and the interior of the window is replaced with the color with higher brightness (lighter) Further, although color clustering generally requires repetitive calculation, calculation efficiency is enhanced here by using a high-speed color threshold processing algorithm [S. C. Pei and C. M. Cheng, "Color image processing by using binary quaternion-moment-preserving threshold processing technique," IEEE Trans. Image Processing, vol. 8, no. 5, pp. 614-628, 1999.] based on a quaternion representation of an image and a moment preserving principle. Further, in order to determine "scale" of the processing, the maximum size S of the window is specified. Through this operation, when a region within the window has the characteristic of (b), show-through is removed. However, when this operation is executed on a region having the characteristic of (c) or (d), the image is degraded or distorted if the maximum size S is too large. It will be considered how to deal with the problem in (4) explained below.

3) Image Synthesis

A show-through removed image is synthesized by using the original image for the periphery of the edge and the background color estimated in the characteristic (2) for any portion other than the edge.

4) Correction to Show-Through Removed Image Based on Multi-Scale Analysis of an Edge Difference As is clear from the operation of (1), the edge included in the show-through removed image is supposed to be a partial cluster of edges of the original image. Viewing each pixel, the edge intensity in the show-through removed image can not possibly be higher than that in the original image. If there is any edge, that does not exist in the original image, in the show-through removed image, this is a side effect produced due to the fact that the processing scale (maximum size S of the window) is too large in the operation (2). In order to correct this effect, estimation of a background color is performed again in a smaller scale around the dummy edge, so that the show-through removed image is corrected. It is desirable to determine appropriately the processing scale adequate to each image, but this is quite difficult in an actual case. Accordingly, the appropriate scales are determined one after another while the result of the processing is compared to the original image based on the edge information using a coarse-to-fine strategy.

One characteristic of this invention is to perform local color threshold processing using a window of size S (which is explained later with reference to a detailed flow chart). This parameter S means the maximum size of a show-through portion to be removed, and a show-through portion of the size within a rectangle of approx. S×S is detected. Further, the value of S is different between a portion of a complicated image and a portion of a simple image, so that the value is required to be adjusted appropriately. Accordingly, in this invention, the value of S is controlled by comparing the edge intensity of the original image with that of the show-through removed image, and the processing for locally-executed color threshold processing is incorporated.

Further, another characteristic of this invention is to speed up the processing by using a reduced image (e.g., 400 dpi is reduced to 100 dpi by converting an average of colors for each 4×4 pixels to a color for one pixel). For example, when show-through of the size of about 2 mm is to be removed, in the image reduced to 100 dpi, S is 8 pixels.

Figure 3:
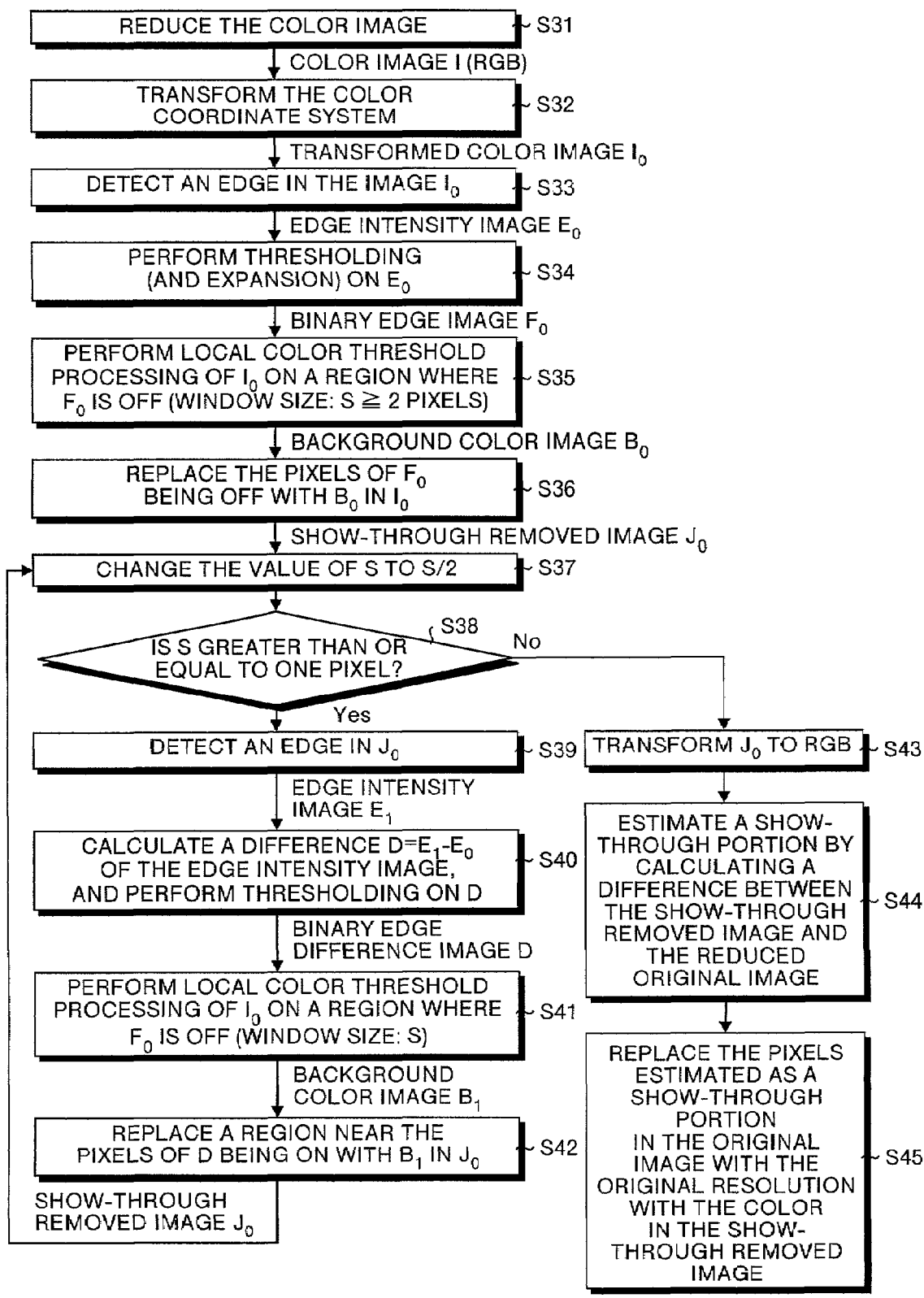
FIG. 3 is a flow chart showing in detail the color image processing method according to an embodiment of this invention.

FIG. 3 is a flow chart showing the color image processing method according to an embodiment of this invention in detail. Each segment of the algorithm is explained in detail with reference to FIG. 3.

At step S31, the resolution of a color image read by a scanner or the like is reduced, and a color image I (RGB) is output.

Color Coordinate Transformation

Coordinates of the color image I are transformed to another color coordinate system to be a transformed color image $I_O$ (step S32). Components in the RGB space are not highly independent from one another, therefore, precision of edge detection may not be improved. Accordingly, the color coordinate is transformed to, for example, YCbCr in equation (1) or a pseudo KL color coordinate system in equation (2).

$$\begin{pmatrix} Y \\ Cb \\ Cr \end{pmatrix} = \begin{pmatrix} 0.299 & 0.587 & 0.114 \\ -0.1687 & -0.3313 & 0.5 \\ 0.5 & -0.4187 & -0.0813 \end{pmatrix} \begin{pmatrix} R \\ G \\ B \end{pmatrix} \quad (1)$$

$$\begin{pmatrix} I_1 \\ I_2 \\ I_3 \end{pmatrix} = \begin{pmatrix} 1/3 & 1/3 & 1/3 \\ 1/2 & 0 & -1/2 \\ -1/4 & 1/2 & -1/4 \end{pmatrix} \begin{pmatrix} R \\ G \\ B \end{pmatrix} \quad (2)$$

Edge Detection

Edge detection is executed on the transformed color image $I_O$ to generate an edge intensity image $E_O$ (step S33) As a method for edge detection from a color image, the simplest method is to seek a square sum root of respective edge intensity calculated by a Sobel operator or the like applied to each component. There is another method for edge detection based on a vector method as explained in the cited document [Edge detection in multispectral images (A. Cumani)], [Detecting boundaries in a vector field (H.-C. Lee and D. R. Cok)], and it has been known that robustness against noise in the method is more excellent than a simple method. In the edge detection method based on a vector method, a square sum root is not simply obtained in combination of the edge intensity calculated in components but correlation between the components is considered. More specifically, assuming that u (x, y), v (x, y), and w (x, y) are three components of color and these three components are defined by p (equation (3)), t (equation (4)), and q (equation (5)), so that the edge intensity at a pixel (x, y) is obtained by equation (6).

$$p = \left(\frac{\partial u}{\partial x}\right)^2 + \left(\frac{\partial v}{\partial x}\right)^2 + \left(\frac{\partial w}{\partial x}\right)^2 \quad (3)$$

$$t = \left(\frac{\partial u}{\partial x}\right)\left(\frac{\partial u}{\partial y}\right) + \left(\frac{\partial v}{\partial x}\right)\left(\frac{\partial v}{\partial y}\right) + \left(\frac{\partial w}{\partial x}\right)\left(\frac{\partial w}{\partial y}\right) \quad (4)$$

$$q = \left(\frac{\partial u}{\partial y}\right)^2 + \left(\frac{\partial v}{\partial y}\right)^2 + \left(\frac{\partial w}{\partial y}\right)^2 \quad (5)$$

$$\frac{1}{2}\left(p + q + \sqrt{(p+q)^2 - 4(pq - t^2)}\right) \quad (6)$$

Figure 4:
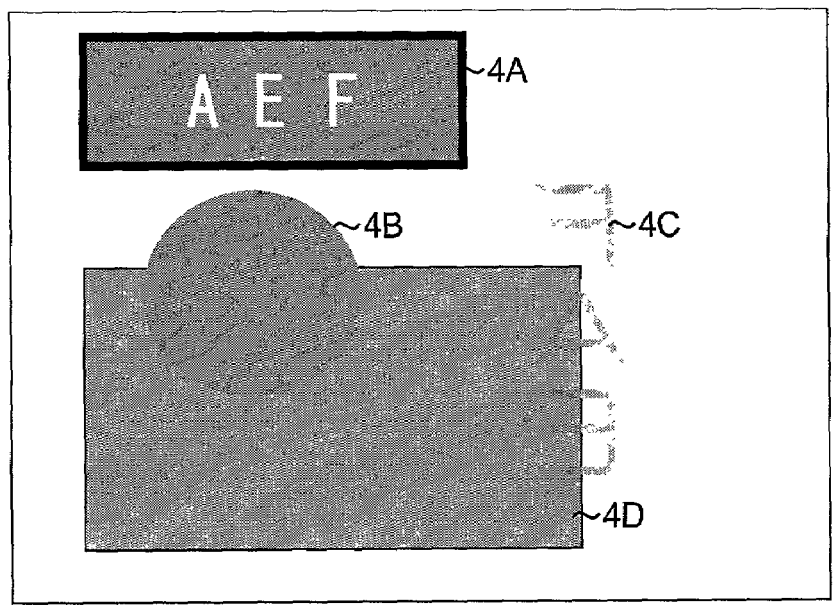
Figure 5:
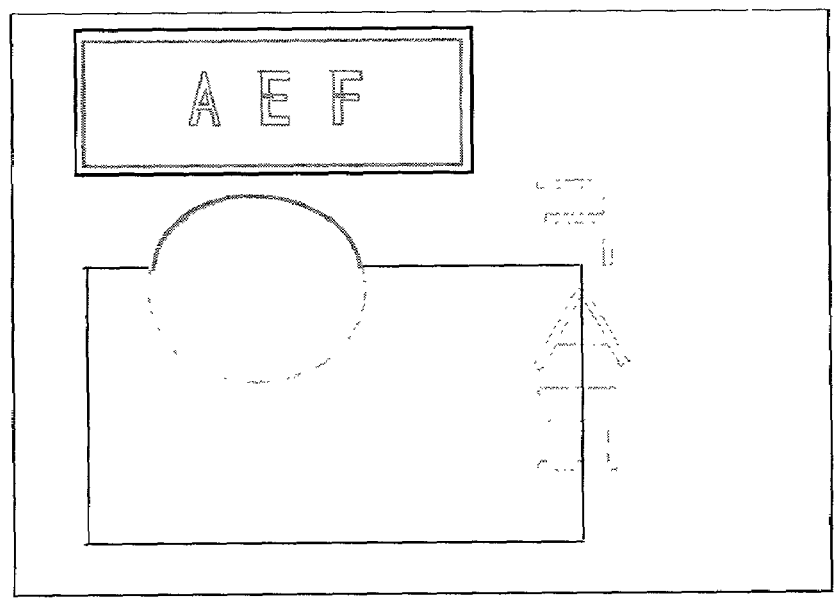
FIG. 5 shows an edge intensity image generated by a vector Sobel operator applied to the image in FIG. 4.

FIG. 4 shows an example of a color image with show-through, and FIG. 5 shows an edge intensity image $E_O$ generated by a vector Sobel operator applied to the image in FIG. 4. In FIG. 5, pixels with high intensity are represented in black.

Threshold Processing and Expansion Processing of Edge Intensity

The threshold processing and expansion processing of edge intensity are executed on the edge intensity image $E_O$ to generate a binary edge image $F_O$ (step S34). Thresholds in the threshold processing for the edge intensity are automatically set by statistically analyzing intensity distribution, or a plurality of thresholds are previously provided and any of them is set by a user according to a degree of show-through or paper quality.

Figure 6:
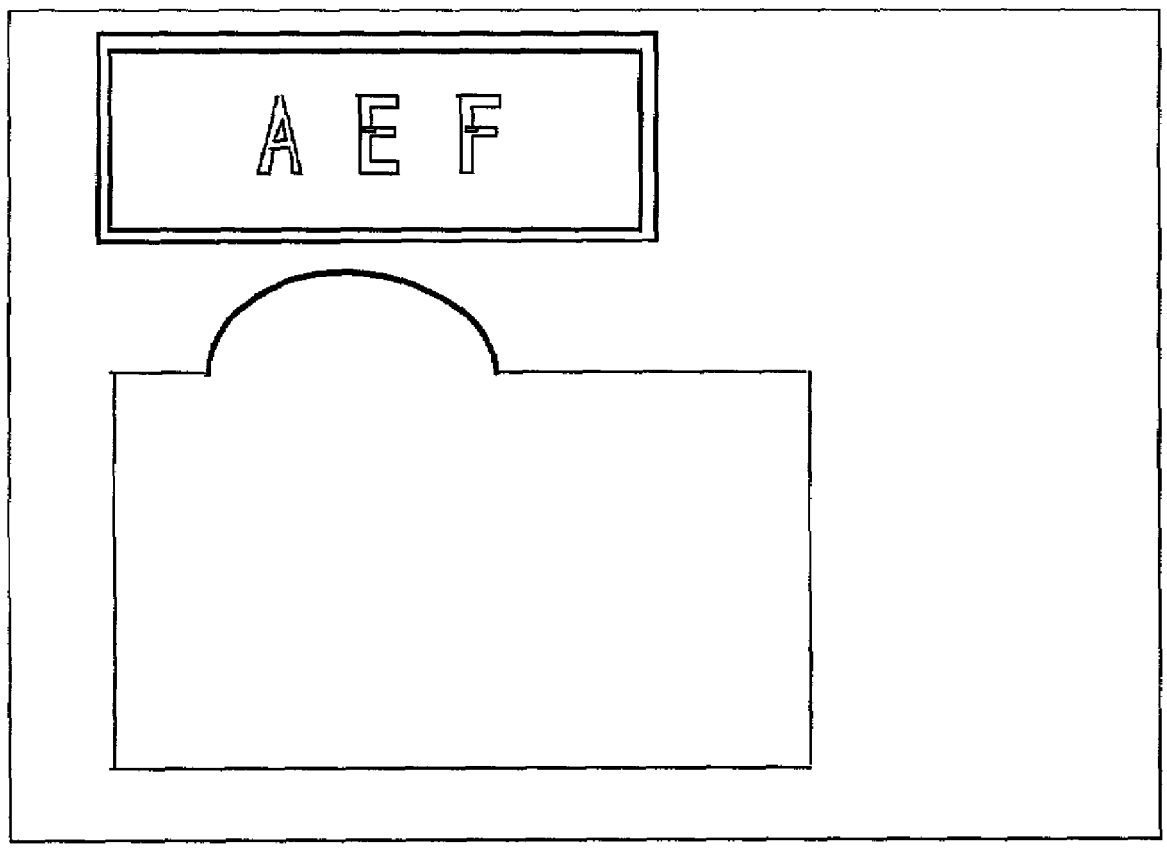
FIG. 6 shows a result of binarizing the color edge intensity in FIG. 5.

FIG. 6 shows a result of binarizing the color edge intensity in FIG. 5. In the binary edge image $F_o$, a pixel whose edge intensity is higher than the threshold is represented as ON, and any pixel other than the pixel is represented as OFF. Further, in the binary edge image $F_o$, the expansion processing is subjected to the pixel of ON as required.

Estimation of a Background Color Based on Locally-Executed Color Threshold Processing The locally-executed color threshold processing for the transformed color image $I_o$ is then performed on a region where the binary edge image $F_o$ is OFF to generate a background color image $B_o$ (step S35). That is, a local background color for a region where pixels are OFF on the binary edge image $F_o$ is estimated. Further, in the original image, by replacing the OFF-pixels on the binary edge image $F_o$ with the background color image $B_o$, a show-through removed image $J_o$ is generated (step S36). The processing for estimating a background color based on this local color threshold is explained in more detail.

Figure 7:
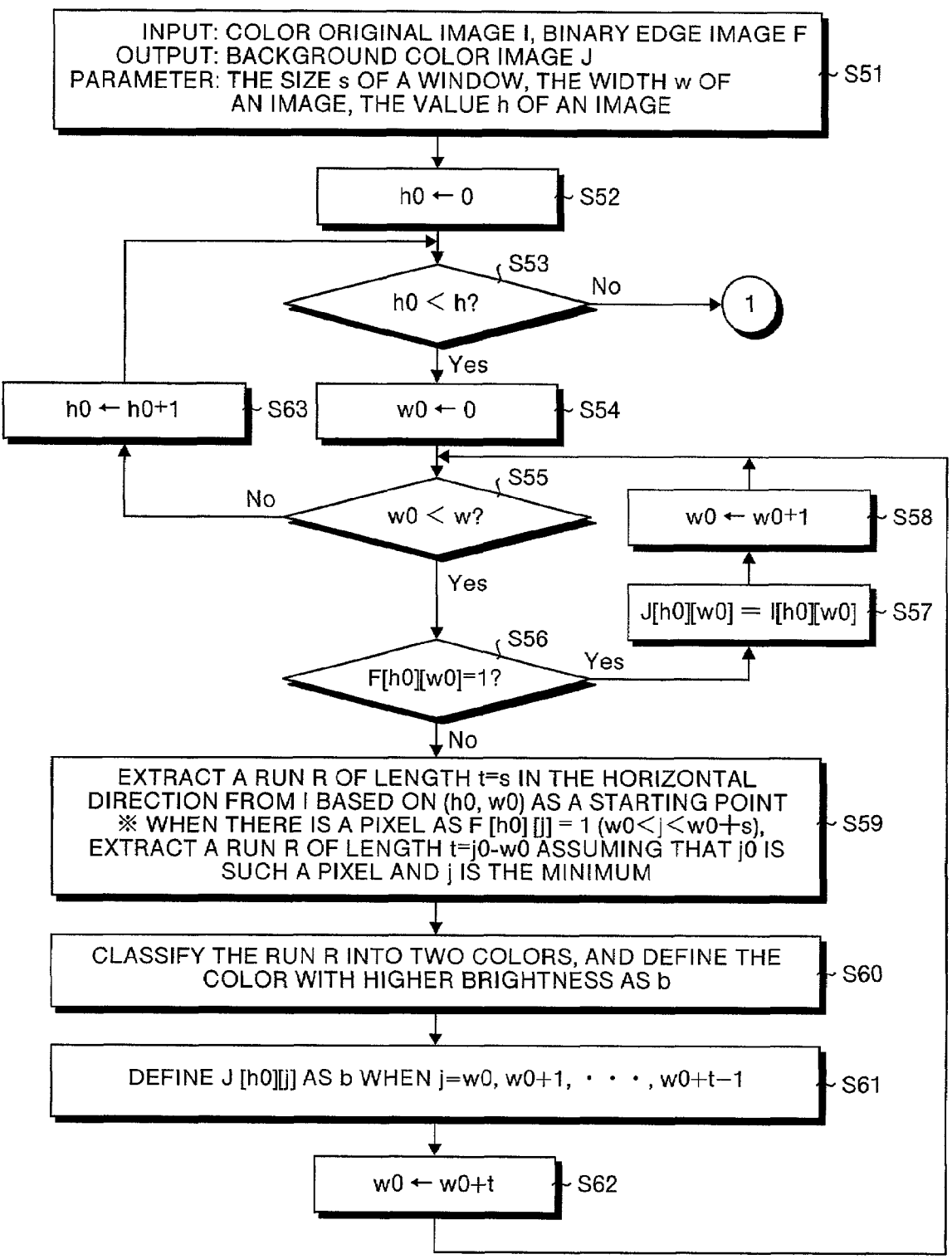
FIG. 7 is a flow chart showing locally-executed color threshold processing using a window of size S in detail.
Figure 8:
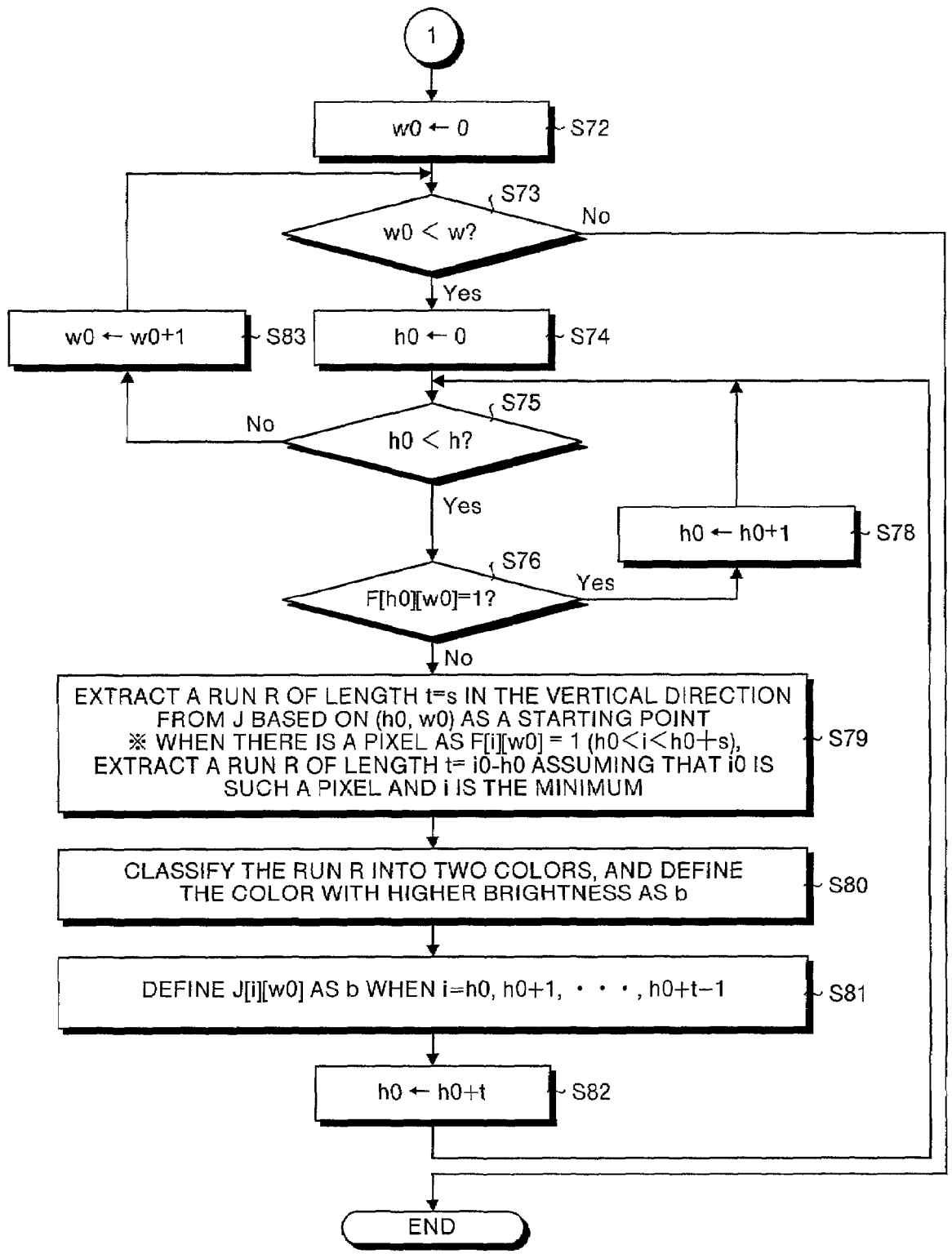
FIG. 8 is a flow chart showing locally-executed color threshold processing using a window of size S in detail.

FIG. 7 and FIG. 8 are flow charts showing in detail the locally-executed color threshold processing using a window of size S. The processing for estimation of a background color is explained with reference to FIG. 7 and FIG. 8.

This locally-executed color threshold processing is performed, assuming parameters such as the size of the window: s, the width of the image: w, and the height of the image: h, by inputting a color original image I and a binary edge image F to generate a background color image J as a final output.

At first, the parameters and the images I and F are input (step S51). A count value h0 of height of the image is then set to 0 (step S52). At step S53, it is determined whether h0 satisfies h0<h (step S53). When the value h0 is greater than h, the processing proceeds to step S72 explained later. When the value h0 is smaller than h, a count value w0 of a width of the image is set to 0 at step S54. At step S55, the widths w and w0 of the images are compared to each other. When the value w0 is greater than w, the value h0 is incremented by one (step S63), and the processing returns to step S53. When w0 is smaller than w, the processing proceeds to step S56, and it is detected whether the binary edge image F[h0][w0] of the value h0 and the value w0 is 1, that is, whether the image has an edge. If any edge exists, the color original image I [h0] [w0] is determined as a background color image J [h0] [w0] (step S57), the value w0 is incremented by one (step S58) and the processing returns to step S55. If it is determined at step S56 that no edge exists, a run R of length t=s in the horizontal direction is extracted from the color original image I at the point (h0, w0) as its starting point (step S59) However, when there is a pixel as F[h0] [j]=1 (w0<j<w0+s), a run R of length t=j0−w0 is extracted assuming that j0 is such a pixel and j is the minimum.

The run R is then classified into two colors and the color with higher brightness is defined as b (step S60), and J [h0] [j] is defined as b when j=w0, w0+1, . . . , w0+t−1 (step S61). Subsequently, the value w0 is incremented by t (step S62), and the processing returns to step S55. Finally, the operation is repeated during the period when w0<w and h0<h are satisfied, and from then on, the processing continues to step S72.

A run R in the vertical direction is extracted in the same manner as the method for extracting the runs in the horizontal direction. Actually, at steps S72 to S76, S78 and S83, the transposed operations in the horizontal direction and the vertical direction at steps S52 to S56, S58 and S63 are executed. At step S76, if it is determined that no edge exists, a run R of length t=s in the vertical direction is extracted from the background color image J based on (h0, w0) as a starting point (step S79). However, when there is a pixel as F [i] [w0]=1 (h0<i<h0+s), a run R of length t=i0−h0 is extracted assuming that i0 is such a pixel and i is the minimum.

The run R is then classified into two colors and the color with higher brightness is defined as b (step S80), and J [i] [w0] is defined as b when i=h0, h0+1, . . . , h0+t−1 (step S81). Subsequently, the value h0 is incremented by t (step S82), and the processing returns to step S75. Finally, the operation is repeated during the period when h0<h and w0<w are satisfied, and then, the processing is ended. An example of formation of the runs is explained below.

Figure 9A:
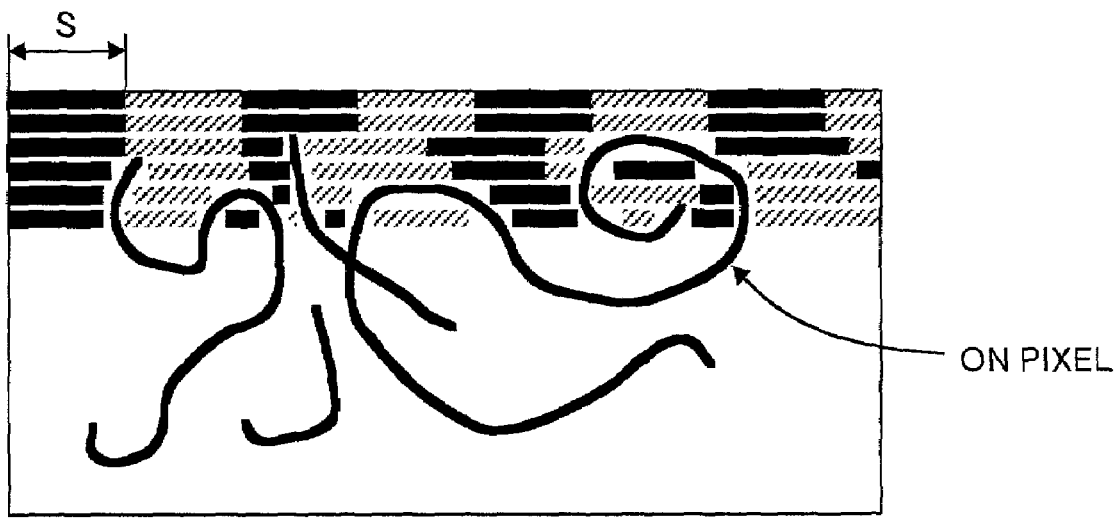
FIG. 9A and FIG. 9B show examples of formation of runs in order to estimate a background color.
Figure 9B:
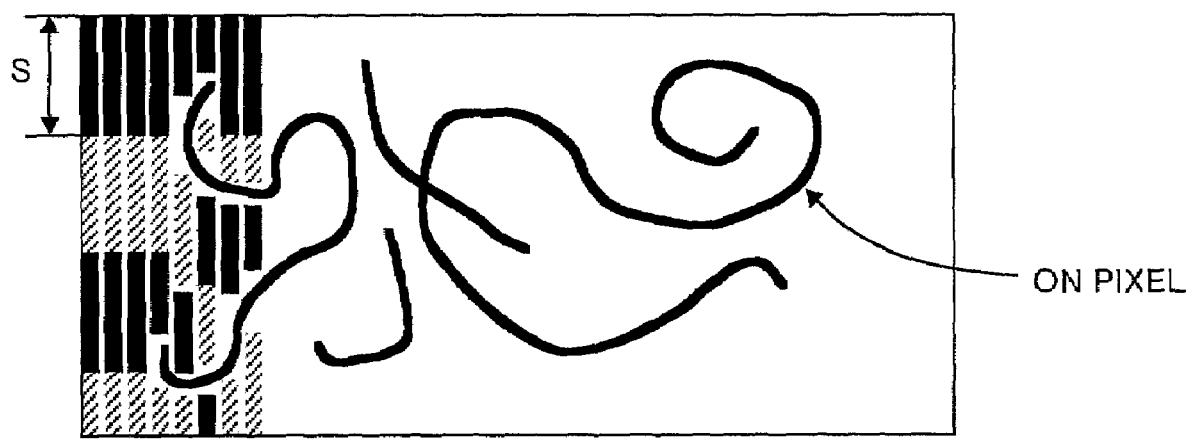

FIG. 9A and FIG. 9B show examples of formation of runs in order to estimate a background color. FIG. 9A shows runs in the horizontal direction, and FIG. 9B shows runs in the vertical direction. As shown in FIG. 9A, each run, whose maximum length is S and which does not include an ON pixel of a binary edge image in such a run is successively formed in each horizontal line. In each of the runs, pixels forming a run is classified into two typical colors. Such "color clustering" generally requires repetitive calculation. However, the high-speed threshold processing algorithm (S. C. Pei and C. M. Cheng) based on a quaternion representation of an image and a moment preserving principle is used. This algorithm has a characteristic in that the two typical colors and a classification boundary are obtained as closed form solutions without performing repetitive calculation. Of the two typical colors thus calculated, a lighter color (higher brightness) is set to a color of each pixel forming the run. As explained above, an image B', which has been subjected to estimation of a background color using the horizontal runs, is obtained.

In general, the edge in a show-through portion (show-through region) is weaker than the edge of a front side image, therefore, as a result of threshold processing the edge, the show-through portion is included in "a region with no edge". In the show-through portion, the density is lower (dark color) than that of a background color on the front side, therefore, "binarization (two typical colors within a region are calculated)" is executed on an S×S region, and a region is replaced with a brighter color. Accordingly, the show-through portion having an S×S size or less is removed.

It is difficult to arrange an S×S rectangle so that the edge is not included in the rectangle when there is an edge. Therefore, as explained above, runs in the horizontal direction in order to estimate a background color are formed (FIG. 9A). The maximum length of the run is S, and the runs are formed so that ON pixels of a binary edge image are not included in the runs. "Binarization (two typical colors within a region are calculated)" is executed on each of the runs, and the region is replaced with a brighter color. With respect to the image generated as a result, runs in the vertical direction are formed in the same manner as explained above, and the same processing as that in the case of the horizontal direction is performed (FIG. 9B).

Figure 10A:
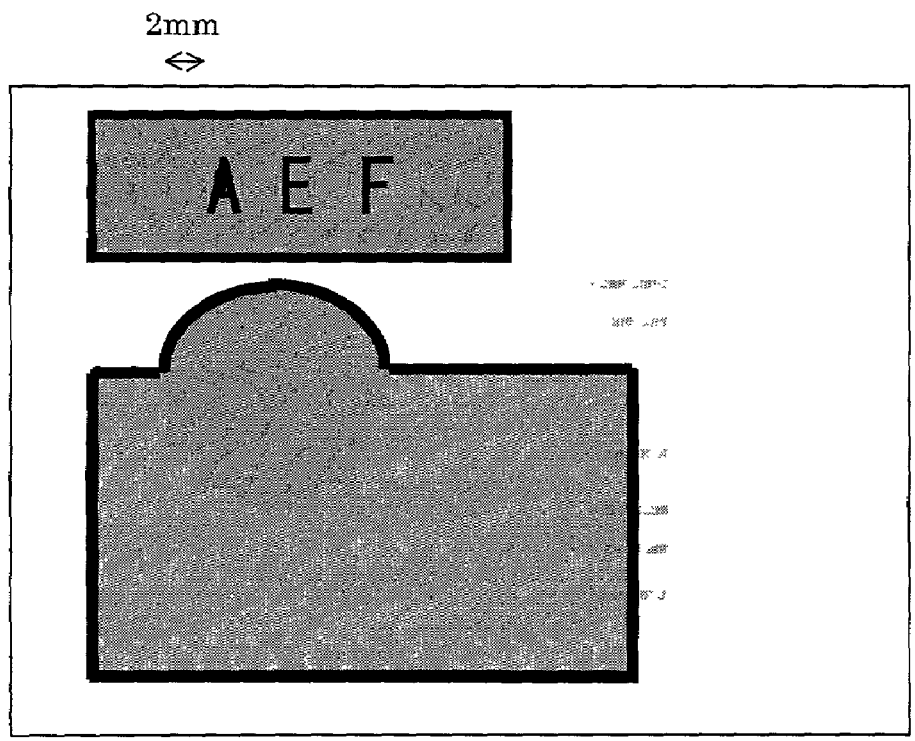
FIG. 10A and FIG. 10B show images as results of estimating the background colors based on the locally-executed color threshold processing.
Figure 10B:
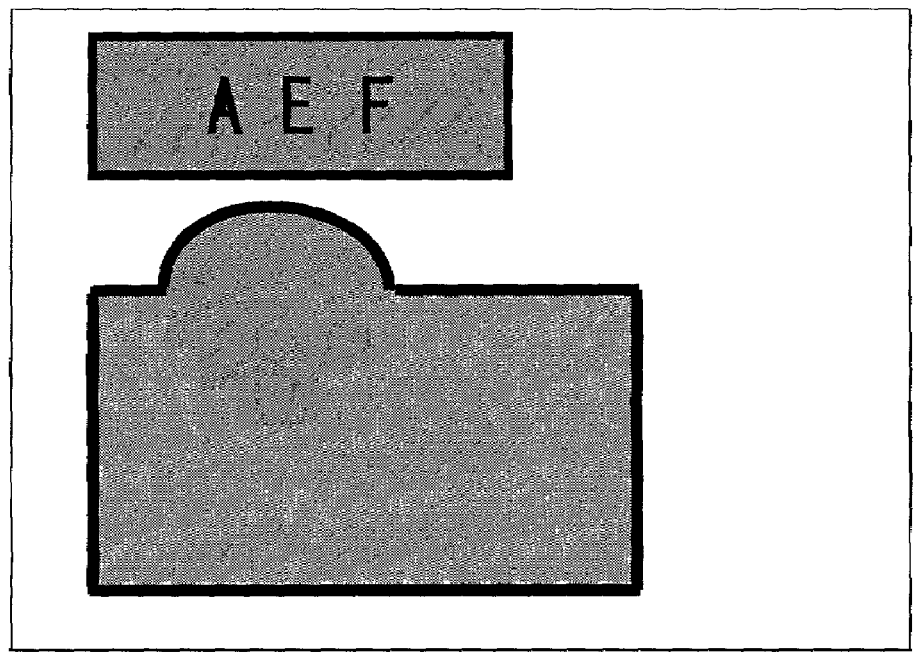

FIG. 10A and FIG. 10B show images as results of estimating the background colors based on the locally-executed color threshold processing. FIG. 10A shows the image as a result of setting S to 2 mm in the image of FIG.

4 and estimating a background color using the horizontal runs. FIG. 10B shows the image as a result of estimating a background color further using the vertical runs for the background color image in FIG. 10A.

Further, as shown in FIG. 9B, the runs in the vertical direction are formed, and the generated image B' is subjected to the processing for estimating a background color. Brightness of each pixel in the background color image B generated as a result of the processing (which is explained as J in the flow chart of FIG. 7 and FIG. 8) becomes higher (lighter) than B'.

By subjecting the runs in the horizontal direction and the vertical direction to the processing for estimating the background color in such a manner, a background color image $B_0$ is generated (step S35 in FIG. 3). Further, in the original image, by replacing the pixels in which the binary edge image $F_0$ is OFF with $B_0$, a show-through removed image $J_0$ is obtained (step S36)

Figure 11:
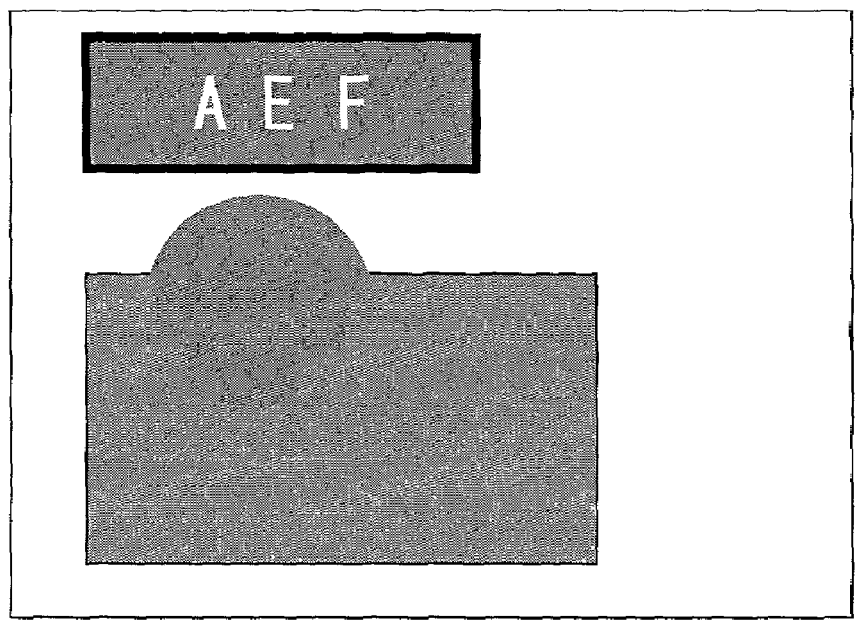
FIG. 11 shows a show-through removed image with respect to the image in FIG. 4 when the size S is set to 2 mm.

FIG. 11 shows the show-through removed image $J_0$ with respect to the image in FIG. 4 when the size S is set to 2 mm.

Correction to a Show-through Removed Image Based on Multi-Scale Analysis of an Edge Difference Correction to a show-through removed image based on multi-scale edge difference analysis is further explained with reference to the flow in FIG. 3. The size S of the window is reduced (S/2 in this embodiment) (step S37), and it is determined whether the window size S is greater than or equal to one pixel (step S38). If S is greater than one pixel, the processing proceeds to step S43 and thereafter. When $S \geq 1$, a show-through removed image is corrected based on the multi-scale edge difference analysis, which will be explained below.

An edge in the show-through removed image $J_0$ is detected at each pixel (step S39), and the edge intensity $E_0$ of the original image is subtracted from the detected edge intensity $E_1$ to generate an edge difference image (step S40). In most of the pixels, each difference (residual) becomes a value of 0 or less. This edge difference image is binarized to generate a binary edge difference image D. A pixel whose difference is the threshold or more is indicated as ON, and the other pixels are indicated as OFF.

Figure 12:
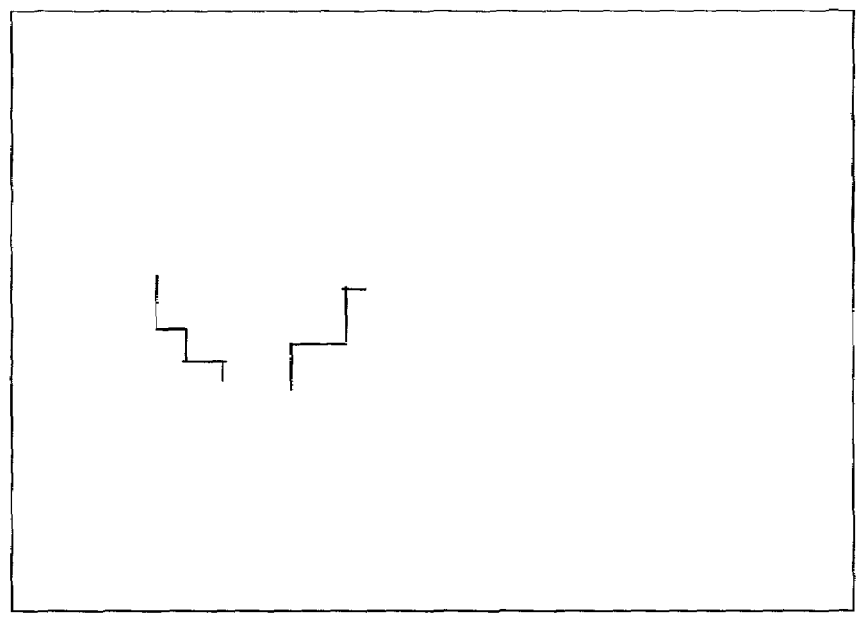
FIG. 12 shows an image based on a binary edge difference with respect to the image in FIG. 11 when the size S is set to 2 mm.

FIG. 12 shows a binary edge difference image D with respect to the image in FIG. 11 when the size S is set to 2 mm. In FIG. 12, as represented by a circular arc section in the lower part of FIG. 11, the portion, that is not regarded as an edge as a result of binarizing the difference between the edge intensity $E_1$ in the show-through removed image $J_0$ in FIG. 11 and the edge intensity image $E_0$ in FIG. 5, does not remain as an edge. Conversely, the portion that remains as an edge is determined as ON pixels, and the processing proceeds to step of estimating a background color explained below.

The processing for estimating a background color is executed on the periphery of ON pixels in the binary edge difference image D by using the new value of S that has been reduced to the half at step S37, and a background color image $B_1$ is generated (step S41). In the show-through removed image $J_0$, the color of (2S+1)×(2S+1) pieces of pixels near the ON pixels in the image D is replaced with color in the new background color image $B_1$ (step S42).

Figure 13:
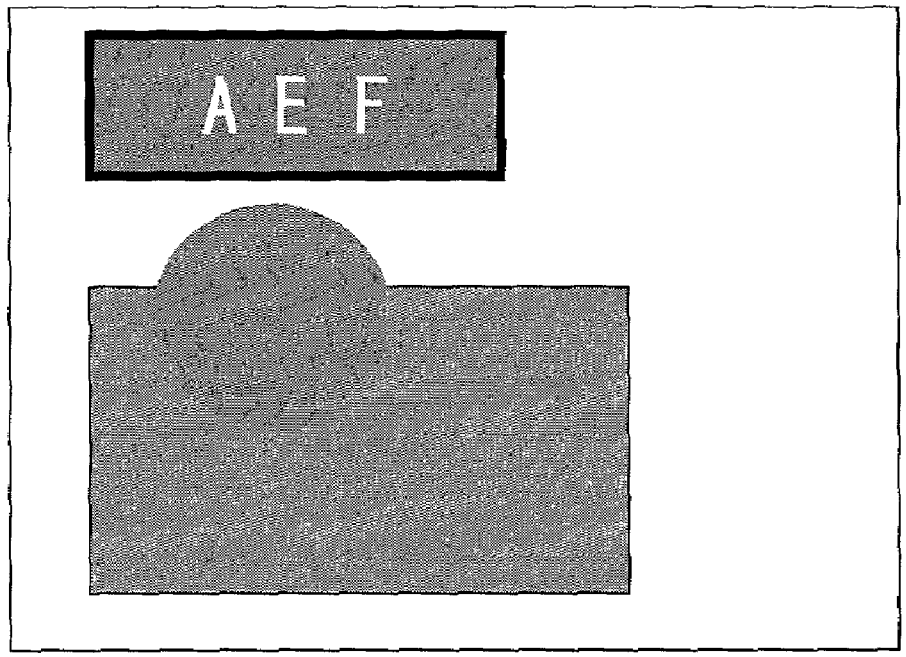
FIG. 13 shows a result of applying this processing to the periphery of the black pixels in FIG. 12.

FIG. 13 shows a result of applying this processing to the periphery of the black pixels in FIG. 12. The processing for correction is recursively repeated until the length S becomes less than one pixel, or until no pixel remains after the edge difference image is thresholded.

When the show-through removed image $J_0$ is finally generated, this color coordinate system is reversely transformed to be restored to RGB (step S43), and the show-through portion is identified (step S44). The identification of the show-through portion is performed by calculating a difference between the show-through removed image $J_0$ and the reduced original image. In an actual case, a difference between three components of a color is calculated, the difference is converted to brightness, or an Euclidean distance or a distance in a Lab color space is calculated. The distance is thresholded to detect a show-through portion.

Lastly, the pixels determined as a show-through portion in the original image with the original resolution are replaced with the color in the show-through removed image (step S45). In this replacement, the color of the pixels on the show-through removed image obtained from the reduced image is allocated to a corresponding region on the original image with the original resolution. For example, one pixel of a 100 dpi-reduced image corresponds to 4×4 pixels of the original image.

Figure 14:
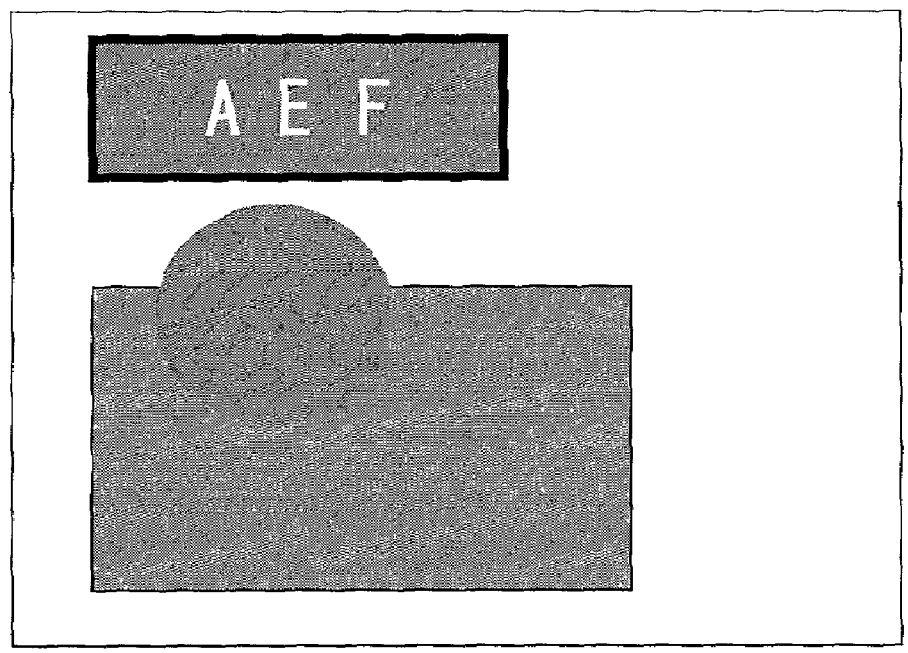
FIG. 14 shows a result of the processing performed on the image in FIG. 4.
Figure 15:
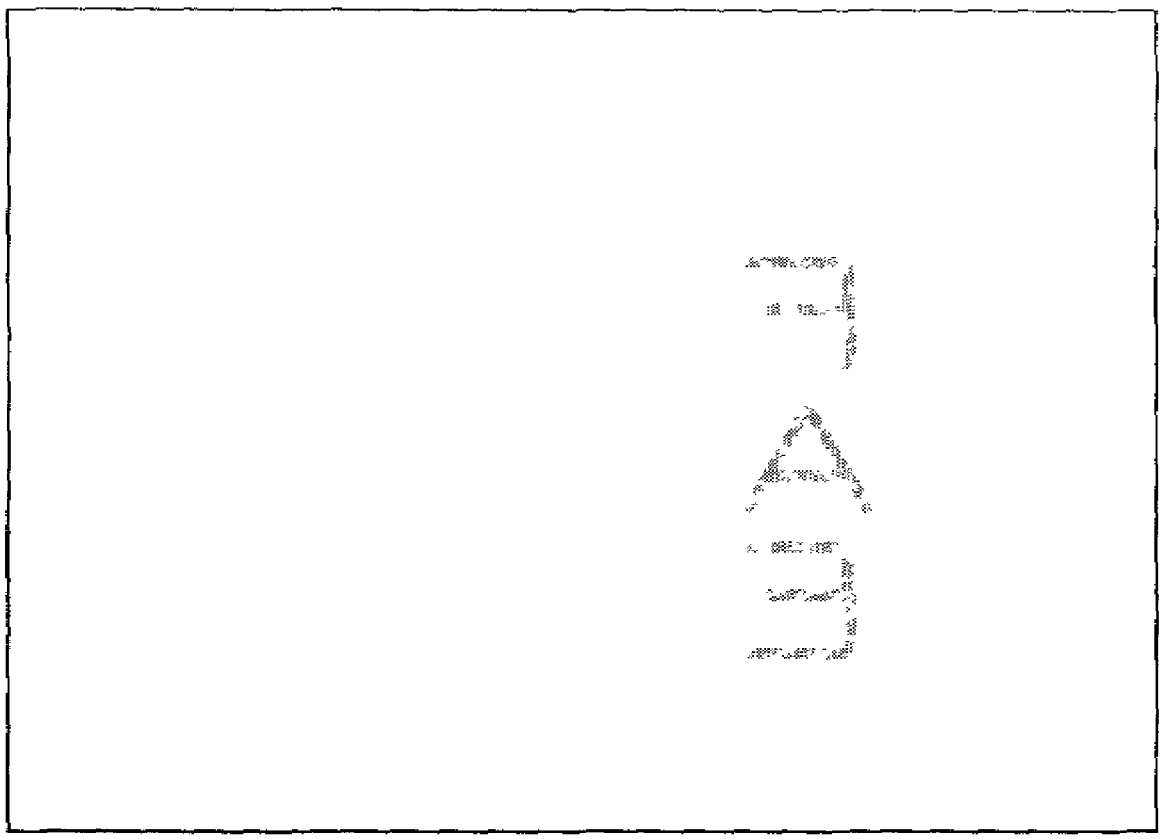
FIG. 15 shows an image subjected to mirror-image conversion displayed in a gray scale by taking a difference between the images in FIG. 4 and FIG. 14 in order to show the removed component.

FIG. 14 shows a result of the processing performed on the image in FIG. 4. FIG. 15 shows an image obtained by taking a difference between the images in FIG. 4 and FIG. 14 displayed in a gray scale in order to show the removed component.

Although the color image processing method and apparatus according to this invention have been explained, as the embodiments of this invention, a computer-readable recording medium, where a program for making a computer execute the color image processing method or for making a computer execute the processing of the color image processing apparatus is recorded, can also be provided.

According to this invention, advantageous effects as follows are produced.

(1) By detecting edge intensity, a foreground portion of a color document such as a text or a line drawing and a background portion where brightness is higher (light color) than that of a show-through portion can be retained.

(2) By color threshold processing, the show-through portion can be corrected without entry or storage of a rear side image. Further, the front side and the show-through portion can be discriminated, and a color can specifically be estimated. The size of a show-through portion to be removed can explicitly be specified by the size of a window to be set, and the processing is performed based on local operation, which leads to economy on a used space in the working memory and simplification of installation.

(3) By generating an edge difference image between the original image and the show-through removed image, that is, by comparing the original image with the image produced as a result of the processing, any portion where the image is degraded due to inadequate processing can be detected by a simple operation. By executing again the processing on the periphery of the portion, it is possible to prevent degradation in the image and improve the result of the processing.

(4) The size of a show-through portion to be removed depends on a local characteristic (complexity or the like) of a front side image. However, in its complicated portion, by reducing the size of a show-through portion to be removed that is determined based on the size of a window (color threshold processing for correction using a small-sized window), degradation in the front side image can be prevented.

(5) The color coordinate system of the RGB space, where components are not highly independent from one another and precision in edge detection and robustness against noise may not increase, is transformed to an appropriate one, so that the precision in edge detection and the robustness against noise are improved.

(6) A low-resolution image is produced, and the processing for removing show-through is subjected to the image, a show-through portion is detected by comparing the image with its original image, and the detected portion is replaced with an appropriate color. That is, the image produced by reducing the original image is subjected to processing, which makes it possible to speed up the processing, economize on a used space in the working memory, and simplify installation.

(7) No specific input equipment is required, so that this invention can be applied to any general-purpose image input equipment.

The present document incorporates by reference the entire contents of Japanese priority documents, 11-354412 filed in Japan on Dec. 14, 1999.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A color image processing method comprising the steps of:
    edge-detection of a digital color original image obtained by digitally inputting only a single side of a document color-printed on both sides of paper;
    estimating background color of said paper or background color image on said single side based upon edge-detection information from the single side of the document with respect to a portion with low intensity of said detected edge from the single side of the document;
    performing color threshold processing in which said portion with the low edge intensity as a component corresponding to show-through of an image from an opposite side of the document is replaced with said estimated background color or background color image in said original image; and
    generating a show-through removed image as an image from which the component corresponding to the show-through has been removed from the original image without using the image from the opposite side of the document and without degradation of an image printed on the single side of the document.

2. The color image processing method according to claim 1, wherein the edge-detection is performed by calculating edge intensity from each component of an image in which the edge is detected and considering a correlation between respective edge intensity of said components.

3. The color image processing method according to claim 1, wherein the color threshold processing including the steps of:
    binarizing the edge intensity;
    in edge distribution in which a pixel with the edge intensity higher than a threshold is obtained as an ON pixel and a pixel with the edge intensity lower than the threshold is obtained as an OFF pixel,
    setting a window of a predetermined size in a region of said OFF pixels;
    classifying the pixels within each window into two colors;
    estimating a color with higher brightness of said two colors as a background color;
    replacing the color of the pixels within each of said windows with said estimated background color; and
    replacing said original image with said background color image.

4. The color image processing method according to claim 3, wherein the color threshold processing further including the steps of:
    forming a run in each line in a horizontal (or vertical) direction with respect to the region of said OFF pixels;
    estimating said background color or background color image using the horizontal (or vertical) runs;
    forming a run in each line in a vertical (or horizontal) direction with respect to said estimated background color or background color image in the horizontal (or vertical) direction;
    estimating a background color or a background color image using the vertical (or horizontal) runs;
    replacing the pixels of said original image corresponding to said OFF pixels with pixels of said estimated background color or background color image in the vertical (or horizontal) direction; and
    replacing said original image with said background color or background color image.

5. The color image processing method according to claim 3, wherein thresholds in binarization of the edge intensity are automatically set by statistically analyzing distribution of the edge intensity.

6. The color image processing method according to claim 3, wherein thresholds in binarization of the edge intensity can be set by a user according to a degree of show-through or paper quality.

7. The color image processing method according to claim 1 further comprising the steps of:
    detecting an edge of said show-through removed image;
    comparing the edge of said detected show-through removed image to the edge distribution of said original image;
    applying again the processing for color threshold processing to the periphery of an edge not existing in said original image, in said show-through removed image; and
    generating a corrected show-through removed image.

8. The color image processing method according to claim 7, wherein, in comparison between the edge of said show-through removed image and the edge distribution of said original image, edge intensity calculated in said original image is subtracted from edge intensity calculated in said show-through removed image at each pixel, and any value higher than a predetermined threshold is determined, in said show-through removed image, as an edge not existing in said original image.

9. The color image processing method according to claim 7 further comprising the step of:
    setting the size of said window smaller than that in the previous processing when said corrected show-through removed image is generated.

10. The color image processing method according to claim 1 further comprising the step of:
    generating a reduced original image with low resolution from said original image;
    generating said show-through removed image with respect to said reduced original image;
    calculating a difference between said show-through removed image and said reduced original image to estimate a show-through region; and
    allocating pixels of said show-through removed image, that correspond to said estimated show-through region, onto said original image with the original resolution.

11. The color image processing method according to claim 1 further comprising the step of:
transforming the color coordinate system of said original image or said reduced original image to another color coordinate system such as a YCbCr coordinate system or a pseudo KL color coordinate system, in which the components are highly independent from one another;
detecting said edge; and
performing transformation reverse to said transformation on said show-through removed image or said corrected show-through removed image.

12. A color image processing apparatus comprising:
an edge detection unit which detects an edge in a digital color original image obtained by digitally inputting only a single side of a document color-printed on both sides of paper;
a background color estimation unit which estimates a background color of said paper or a background color image on said single side based upon edge-detection information from the single side of the document with respect to a low intensity portion of said detected edge from the single side of the document; and
an image replacement unit which replaces the low portion of the edge intensity as a component corresponding to show-through of an image from an opposite side of the document with said estimated background color or background color image in said original image,
wherein said image replacement unit removes said component corresponding to the show-through from the original image and generates said show-through removed image without using the image from the opposite side of the document and without degradation of an image printed on the single side of the document.

13. The color image processing apparatus according to claim 12, wherein said edge detection unit calculates edge intensity from each component of an image in which the edge is detected, and detects the edge considering a correlation between the respective edge intensity of said components.

14. The color image processing apparatus according to claim 12, wherein said edge detection unit comprises a binarization unit which binarizes the edge intensity, said background color estimation unit comprises:
in edge distribution in which a pixel with the edge intensity higher than a threshold is obtained as an ON pixel and a pixel with the edge intensity lower than the threshold is obtained as an OFF pixel,
a window setting unit which sets a window of a predetermined size in a region of said OFF pixels;
a color clustering unit which classifies the pixels within each of said windows set by said window setting unit into two colors; and
an estimation unit which estimates a color with higher brightness of said two colors as a background color, and
said image replacement unit comprises a pixel replacement unit which replaces the color of the pixels within each of said windows with said estimated background color.

15. The color image processing apparatus according to claim 14 further comprising:
a horizontal run formation unit which forms a run in each line in the horizontal direction in the region of said OFF pixels; and
a vertical run formation unit which forms a run in each line in the vertical direction,
wherein said background color estimation unit estimates said background color or background color image using the horizontal (or vertical) runs formed by said horizontal run formation unit (or vertical run formation unit), further estimates a background color or a background color image using the vertical (horizontal) runs formed by said vertical run formation unit (or horizontal run formation unit) with respect to said estimated background color or background color image in the horizontal (or vertical) direction, and
said pixel replacement unit replaces the pixels of said original image corresponding to said OFF pixels with pixels of said estimated background color or background color image in the vertical (or horizontal) direction.

16. The color image processing apparatus according to claim 14, wherein said binarization unit has an automatic threshold setting unit which statistically analyzes the distribution of the edge intensity and automatically sets the threshold.

17. The color image processing apparatus according to claim 14, wherein said binarization unit has a threshold setting unit by which a user sets the threshold according to a degree of show-through or paper quality.

18. The color image processing apparatus according to claim 12 further comprising:
an edge determination unit which detects an edge of said show-through removed image by said edge detection unit, compares said detected edge of the show-through removed image and the edge distribution of said original image, and determines an edge not existing on said original image; and
a repetition unit which generates again a show-through removed image about the periphery of the edge not existing said original image in said show-through removed image.

19. The color image processing apparatus according to claim 18, wherein said edge determination unit subtracts edge intensity calculated in said original image from edge intensity calculated in said show-through removed image at each pixel, and determines any value higher than a predetermined threshold, in said show-through removed image, as an edge not existing in said original image.

20. The color image processing apparatus according to claim 18, wherein said repetition unit sets the size of said window to a smaller value than that in the previous processing when a show-through removed image is again generated.

21. The color image processing apparatus according to claim 12 further comprising:
an image reduction unit which generates a reduced original image with low resolution from said original image;
a show-through region estimation unit which calculates a difference between a show-through removed image generated with respect to said reduced original image and said reduced original image to estimate a show-through region; and
a pixel allocation unit which allocates pixels of said show-through removed image, that correspond to said estimated show-through region, onto said original image with the original resolution.

22. The color image processing apparatus according to claim 12 further comprising:
a coordinate system transformation unit which transforms the color coordinate system of said original image or said reduced original image to another color coordinate system such as a YCbCr coordinate system or a pseudo KL color coordinate system, in which the components are highly independent from one another; and a coordinate system reverse transformation unit which performs transformation reverse to said transformation on the show-through removed image with respect to the image transformed by said coordinate system transformation unit.

23. A color image processing apparatus comprising:
an edge detection means for detecting an edge in a digital color original image obtained by digitally inputting only a single side of a document color-printed on both sides of paper;
a background color estimation means for estimating a background color of said paper or a background color image on said single side based upon edge-detection information from the single side of the document with respect to a low-intensity portion of said detected edge from the single side of the document; and
an image replacement means for replacing the low portion of the edge intensity as a component corresponding to show-through of an image from an opposite side of the document with said estimated background color or background color image in said original image,
wherein said image replacement means removes said component corresponding to the show-through from the original image and generates said show-through removed image without using the image from the opposite side of the document and without degradation of an image printed on the single side of the document.

24. The color image processing apparatus according to claim 23 wherein said edge detection means calculates edge intensity from each component of an image in which the edge is detected, and detects the edge considering a correlation between the respective edge intensity of said components.

25. The color image processing apparatus according to claim 23 wherein said edge detection means comprises a binarization means for binarizing the edge intensity, said background color estimation means comprises:
in edge distribution in which a pixel with the edge intensity higher than a threshold is obtained as an ON pixel and a pixel with the edge intensity lower than the threshold is obtained as an OFF pixel,
a window setting means for setting a window of a predetermined size in a region of said OFF pixels;
a color clustering means for classifying the pixels within each of said windows set by said window setting means into two colors; and
an estimation means for estimating a color with higher brightness of said two colors as a background color, and
said image replacement means comprises a pixel replacement means for replacing the color of the pixels within each of said windows with said estimated background color.

26. The color image processing apparatus according to claim 25 further comprising:
a horizontal run formation means for forming a run in each line in the horizontal direction in the region of said OFF pixels; and
a vertical run formation means for forming a run in each line in the vertical direction, wherein said background color estimation means estimates said background color or background color image using the horizontal (or vertical) runs formed by said horizontal run formation means (or vertical run formation means), further estimates a background color or a background color image using the vertical (horizontal) runs formed by said vertical run formation means (or horizontal run formation means) with respect to said estimated background color or background color image in the horizontal (or vertical) direction, and
said pixel replacement means replaces the pixels of said original image corresponding to said OFF pixels with pixels of said estimated background color or background color image in the vertical (or horizontal) direction.

27. The color image processing apparatus according to claim 25, wherein said binarization means has an automatic threshold setting means which statistically analyzes the distribution of the edge intensity and automatically sets the threshold.

28. The color image processing apparatus according to claim 25, wherein said binarization means has a threshold setting means by which a user sets the threshold according to a degree of show-through or paper quality.

29. The color image processing apparatus according to claim 23 further comprising:
an edge determination means for detecting an edge of said show-through removed image by said edge detection means, compares said detected edge of the show-through removed image and the edge distribution of said original image, and determines an edge not existing on said original image; and
a repetition means for generating again a show-through removed image about the periphery of the edge not existing said original image in said show-through removed image.

30. The color image processing apparatus according to claim 29, wherein said edge determination means subtracts edge intensity calculated in said original image from edge intensity calculated in said show-through removed image at each pixel, and determines any value higher than a predetermined threshold, in said show-through removed image, as an edge not existing in said original image.

31. The color image processing apparatus according to claim 29 wherein said repetition means sets the size of said window to a smaller value than that in the previous processing when a show-through removed image is again generated.

32. The color image processing apparatus according to claim 23 further comprising:
an image reduction means for generating a reduced original image with low resolution from said original image;
a show-through region estimation means for calculating a difference between a show-through removed image generated with respect to said reduced original image and said reduced original image to estimate a show-through region; and
a pixel allocation means for allocating pixels of said show-through removed image, that correspond to said estimated show-through region, onto said original image with the original resolution.

33. The color image processing apparatus according to claim 23 further comprising:
a coordinate system transformation means for transforming the color coordinate system of said original image or said reduced original image to another color coordinate system such as a YCbCr coordinate system or a pseudo KL color coordinate system, in which the components are highly independent from one another; and
a coordinate system reverse transformation means for performing transformation reverse to said transformation on the show-through removed image with respect to the image transformed by said coordinate system transformation means.

34. A computer-readable recording medium storing a computer program containing instructions which when executed realizes the steps of:
- edge-detection of a digital color original image obtained by digitally inputting only a single side of a document color-printed on both sides of paper;
- estimating background color of said paper or background color image on said single side based upon edge-detection information from the single side of the document with respect to a portion with low intensity of said detected edge from the single side of the document;
- performing color threshold processing in which said portion with the low edge intensity as a component corresponding to show-through of an image from an opposite side of the document is replaced with said estimated background color or background color image in said original image; and
- generating a show-through removed image as an image from which the component corresponding to the show-through has been removed from the original image without using the image from the opposite side of the document and without degradation of an image printed on the single side of the document.

* * * * *